United States Patent
Scheruebl et al.

(10) Patent No.: US 6,674,572 B1
(45) Date of Patent: Jan. 6, 2004

(54) CONFOCAL MICROSCOPIC DEVICE

(75) Inventors: Thomas Scheruebl, Jena (DE); Norbert Czarnetzki, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/194,299

(22) PCT Filed: Mar. 3, 1998

(86) PCT No.: PCT/EP98/01177

§ 371 (c)(1), (2), (4) Date: Aug. 11, 1999

(87) PCT Pub. No.: WO98/44375

PCT Pub. Date: Oct. 8, 1998

(30) Foreign Application Priority Data

Mar. 29, 1997 (DE) ............................. 197 13 362

(51) Int. Cl.[7] ............................................... G02B 21/00
(52) U.S. Cl. .................... 359/368; 356/237.5; 356/392
(58) Field of Search ................ 359/368, 385, 359/389; 356/600–624, 237.2–237.5, 391, 392, 393

(56) References Cited

U.S. PATENT DOCUMENTS

| | | | | |
|---|---|---|---|---|
| 3,963,354 A | * | 6/1976 | Feldman et al. ............ 356/394 |
| 4,200,396 A | * | 4/1980 | Kleinknecht et al. ....... 356/384 |
| 4,585,349 A | * | 4/1986 | Gross et al. ................ 356/624 |
| 4,600,831 A | | 7/1986 | Hutley ..................... 250/201.4 |
| 4,725,721 A | | 2/1988 | Nakamura et al. ........ 250/201.5 |
| 4,965,441 A | * | 10/1990 | Picard ........................ 359/389 |
| 5,039,214 A | * | 8/1991 | Nagata et al. ............... 359/389 |
| 5,288,987 A | * | 2/1994 | Vry et al. .................... 359/376 |
| 5,313,265 A | | 5/1994 | Hayes et al. ................ 356/511 |
| 5,321,446 A | * | 6/1994 | Massig et al. .............. 359/235 |
| 5,737,084 A | * | 4/1998 | Ishihara ..................... 356/609 |
| 5,963,314 A | * | 10/1999 | Worster et al. .......... 356/237.2 |

FOREIGN PATENT DOCUMENTS

| | | |
|---|---|---|
| DE | 41 00 478 | 7/1992 |
| DE | 44 19 940 | 12/1995 |
| EP | 0 142 464 | 5/1985 |
| EP | 0 327 425 | 8/1989 |
| EP | 0 466 979 | 1/1992 |
| EP | 0 470 942 | 2/1992 |
| FR | 2 716 727 | 9/1995 |
| WO | WO 95/00871 | 1/1995 |

* cited by examiner

Primary Examiner—Mark A. Robinson
Assistant Examiner—Lee Fineman
(74) Attorney, Agent, or Firm—Reed Smith LLP (57) ABSTRACT

An autofocus for a confocal microscope is realized by means of a confocal microscope arrangement comprising an illumination arrangement for illuminating an object in a raster pattern, first means for generating a first wavelength-selective splitting of the illumination light and second means for generating a second wavelength-selective splitting of the light coming from the object in a parallel manner for a plurality of points of the object, and detection means for detecting the light distribution generated by the second means, wherein an at least point-by-point spectral splitting and detection of an object image in a wavelength-selective manner is carried out and a control signal is generated from the determination of the frequency deviation and/or intensity deviation from a predetermined reference value corresponding to the object position in order to adjust the focal position by means of the vertical object position and/or the imaging system of the microscope. Further, a process is realized for determining deviations of at least a first height profile from at least one simultaneously or previously detected second height profile, preferably for detecting and/or monitoring defects in semiconductor structures, wherein a first object is illuminated in a wavelength-selective manner by a light source and the light originating from the first object is detected and is compared electronically with a previously or simultaneously detected second object.

12 Claims, 8 Drawing Sheets

CONFOCAL MICROSCOPIC DEVICE

BACKGROUND OF THE INVENTION a) Field of the Invention

The invention is directed to a device for rapid and highly precise detection of single defects.

b) Description of the Related Art

A device for profile measurement of surfaces which has a polychromatic light source is known from GB 2144537. The illumination light is split longitudinally in spectra and focused on an object, wherein a determined wavelength corresponds to every focal point. The light reflected by the object travels via a beam splitter to a dispersive element and is focussed by the latter on a photodiode array. The strongest signal is determined by the readout of the photodiode array and is related to the surface of the object.

WO 88/10406 describes a device for the measurement of distances between an optical element with extensive chromatic aberration and an object, likewise for profile measurement, with a structured light source and a spectral-dispersive apparatus and CCD camera.

U.S. Pat. No. 4,965,441 describes a scanning, i.e., point-scanning, confocal arrangement with increased depth resolution, wherein dispersive elements are arranged in the evaluating beam path for wavelength separation.

The principle of a scanning image generation process with an objective lens with a strong chromatic aberration and spectral separation of the light backscattered by the object is also the subject of DE 4419940 A1.

WO 92/01965 describes an arrangement for simultaneous image generation with a moving pinhole in the illumination beam path, wherein the objective can have a strong chromatic aberration and the arrangement is to be used as a profile senor.

WO 95/00871 likewise discloses an arrangement with a moving pinhole and a focusing element with axial chromatism, wherein spectral filters are arranged in front in the evaluating beam path of two cameras. Signal division is effected by pixel to determine wavelength.

Arrangements of the above-mentioned kind are also known from SCANNING, Vol. 14, 1992, pages 145–153.

Further, a system for the generation of a color height image is realized, for example, with the CSM attachment for the Axiotron microscope by the present Applicant. The height profile is inspected by visual evaluation of the color image.

In this connection, a special application is wafer inspection, i.e., the detection of defects on wafers (e.g., settled particles, irregularities in the structure). Defects are visible as chromatically delimited areas. Height differences of less than 0.1 $\mu$m can accordingly be differentiated by color. The accessible height range, the color spread, depends on the utilized objective and is, for example, 4 $\mu$m in the case of a 50× objective.

In automatic wafer inspection, fast detection of defects is necessary. The usual methods used in practice work on the basis of laser scattering or digital image processing. Accordingly, at the present time, defects in the range of 0.2 $\mu$m can be detected with a typical throughput of 20 wafers ($\varnothing$=200 mm) per hour. Laser scattering methods are limited to the detection of particles (dirt, dust), while digital image processing can also detect other types of defects such as structural defects or "pattern defects", as they are called.

As the integration density of electronic circuits increases, fewer detection limits are required. In a 1 GB DRAM, for example, detection of a defect size of 0.1 $\mu$m is considered necessary. In methods using digital image processing, the minimum detectable defect size is determined by the resolving capacity and the speed of inspection is determined by the computer capacity. In this connection, a considerable expenditure on electronic computing is required to process the information at a suitable speed. For example, when scanning a wafer with a 300-mm diameter with a 0.3 $\mu$m grating, a total of $10^{12}$ pixels must be processed in digital image processing.

OBJECT AND SUMMARY OF THE INVENTION

It is the primary object of the invention to enable a fast yet highly precise detection of wafer defects.

According to the invention, this object is met by the independent claims. Preferred further developments are described in the dependent claims. a confocal microscope arrangement comprising an illumination arrangement for illuminating an object in a raster pattern, first means for generating a first wavelength-selective splitting of the illumination light and second means for generating a second wavelength-selective splitting of the light coming from the object in a parallel manner for a plurality of points of the object. Also included are detection means for deflecting the light distribution generated by the second means.

This color image information has the advantage that defects whose height dimension is less than 0.1 $\mu$m can be detected. Further, the optical pre-processing by means of spectral division enables a faster processing of the respective height profile since the height profile of the entire image field is compressed in the spectrum. A highly accurate autofocus which will be described in more detail hereinafter can likewise be realized by the arrangement according to the invention.

The results and advantages of the invention will be explained more fully in the following with reference to the schematic drawings.

BRIEF DESCRIPTION OF THE DRAWINGS

In the drawings.

Table 1 shows color spreads for different objectives.

DESCRIPTION OF THE PREFERRED EMBODIMENTS

Figure 1:
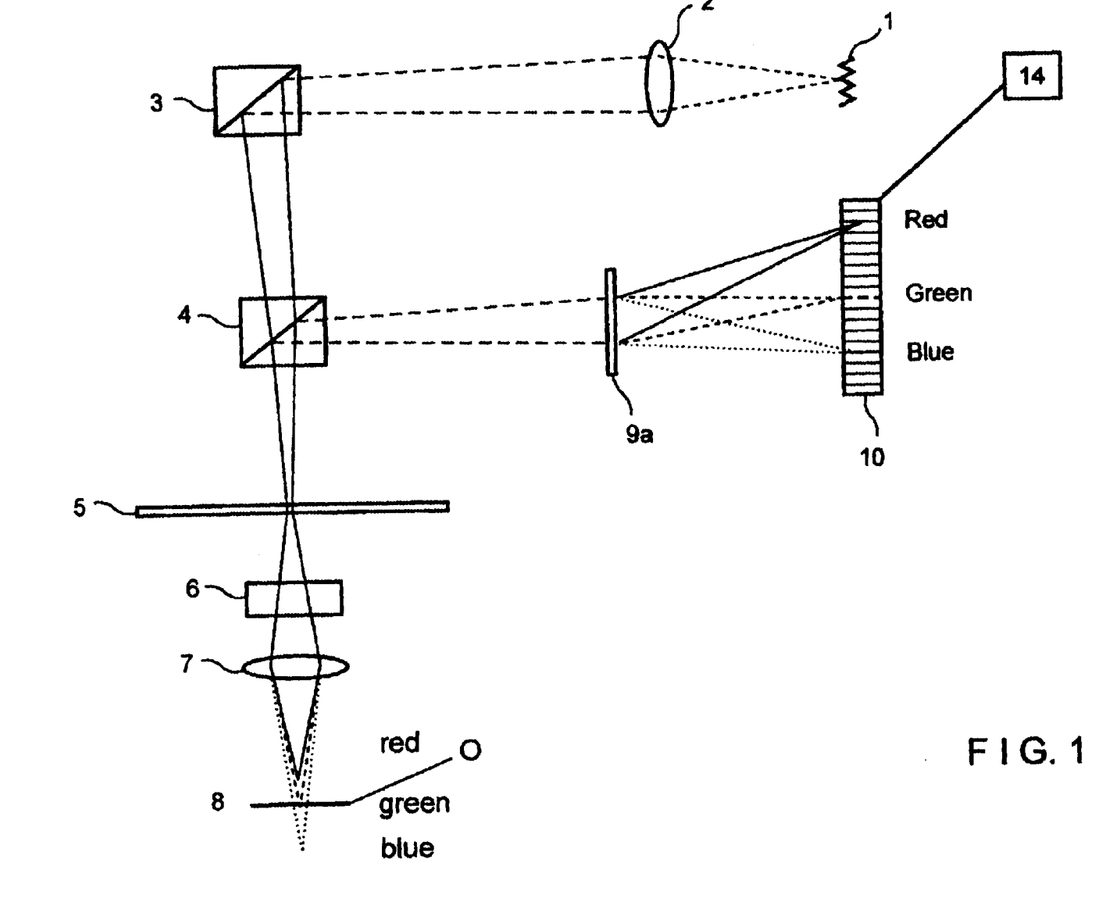
FIG. 1 shows the principle of measurement and of evaluation according to the invention.

In a parallel confocal construction according to FIG. 1 with a light source 1 which can be a white light source but can also be made up of a plurality of lasers of different wavelengths or multi-line lasers, and collector lens 2, mirror 3 and an optical splitter element 4, a perforated screen 5 located in the intermediate image plane of a microscope objective 7 is illuminated. The perforated screen 5 is preferably a rotating Nipkow disk or a double Nipkow disk with a micro-lens arrangement described, for example, in EP 727 684 A2. The perforated disk arrangement is moved in a suitable manner for scanning the image and generates a parallel confocal image.

A deliberate longitudinal chromatic aberration is introduced in the beam path by a chromate 6 in such a way that the focal points 8 of the different color components of the light source 1 lie in different planes after the beam passes through the color-corrected objective 7.

In this way, a parallel confocal image of the object O is obtained, wherein the height information is optically coded by a corresponding color display. This color display is now imaged by means of a dispersive element 9a, for example, a prism or holographic grating, on a diode line or CCD line 10 connected with an evaluating and processing unit 14.

Figure 2:
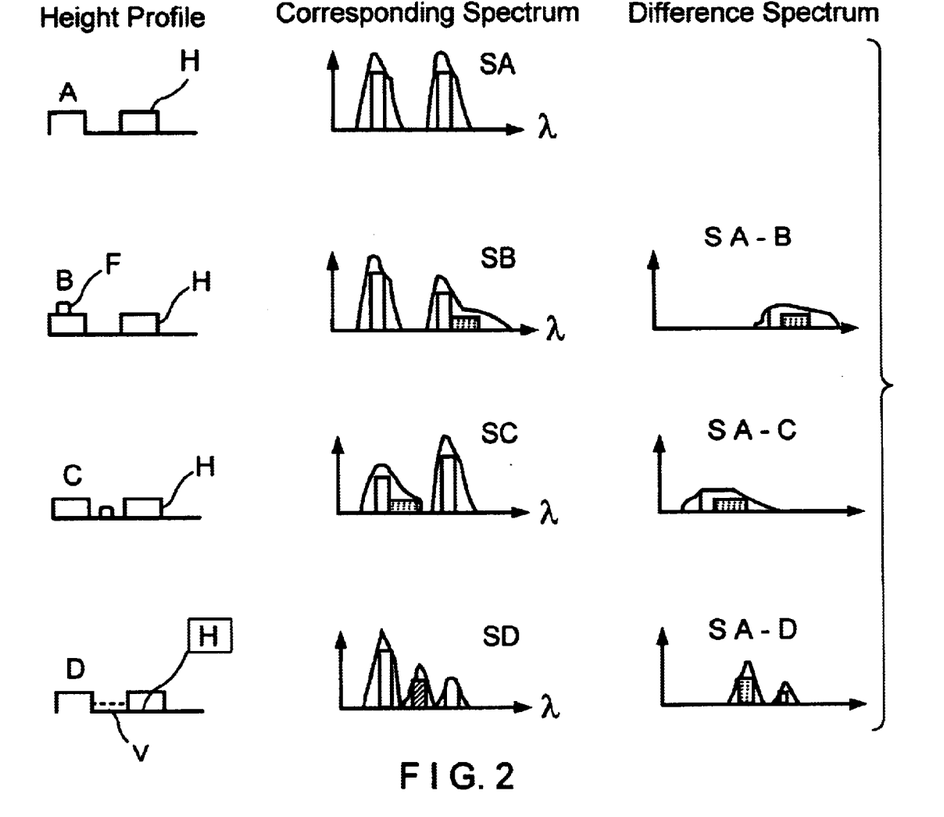
FIG. 2 shows different height profiles and corresponding color-height spectra.

The color-coded height profiles are accordingly divided into an equivalent color spectrum. This is shown in FIGS. 2a–d. The spectral positions of the maxima correspond to the respective height contour lines, while the quantity of events (area below the maximum) is proportional to the surface component of the respective height level.

The object is located on an XY displacement stage, not shown, and is scanned either in a continuous movement or in a step-and-go procedure.

The adjustment of the displacement stage is synchronized with the readout of the receiver 10, so that the read out height information is correlated in a definite manner with the position on the object O.

The vertical adjustment in the Z direction is monitored by an autofocus system or by a special height monitoring algorithm which is described in the following. FIGS. 2a–d show a height profile H, a defect location F to be detected, the spectrum S A-D measured on the receiver and corresponding to the profile, and the difference spectra S A-B, A-C, A-D formed in the evaluation.

It will be clear that information about the type and scope of the existing defect location F can be obtained through a comparison of a spectrum SA corresponding to the ideal height profile and the spectra SB–SD actually measured when monitoring the wafer. Some defect types F are shown by way of example in FIG. 2 without limiting to these examples. Case A in FIG. 2a shows an ideal defect-free height profile. A particle F on the uppermost layer is shown in FIG. 2b, and a particle between two height structures H is shown in FIG. 2c. FIG. 2d shows a deflective connection V between the two height structures H. It can be seen that the corresponding spectra SA–SD differ from one another depending on the type of defect. The corresponding difference spectra A-B, A-C, A-D are likewise distinguished, depending on the type of defect present, with respect to position, width and intensity of the corresponding maxima. These differences make it possible to obtain information about the existing type and size of defect.

Different methods may be applied advantageously for detecting defects in applications such as wafer inspection:

1. Two adjacent spectra are recorded and subtracted from one another as is shown schematically in FIG. 2. The maxima in the differential spectrum which lie above a preestablished noise level are determined by a routine, e.g., a peak-search routine, such as is usually used in optical spectroscopy. When such maxima are present, a defect is located in the area being examined. The position and the corresponding spectra or the reference spectrum are stored. The spectra are subsequently evaluated more exactly in a classifying unit because additional information about the type of defect which can be used for classifying the defect is contained in the position and half-value width.

2. The comparison of spectra is carried out as described above in 1, except that an ideal stored spectrum is utilized as comparison spectrum.

3. Initially, a plurality of spectra are recorded and a reference spectrum is formed therefrom by averaging. This averaged reference spectrum is then compared with an actual spectrum as described in 1.

In the indicated defect detection algorithm, height monitoring is necessary because a height difference leads to a displacement of the spectra relative to one another. In principle, this height monitoring can be carried out with a conventional autofocus system or with the height monitoring algorithm which is described in the following and which uses the spectral height information.

Figure 3:
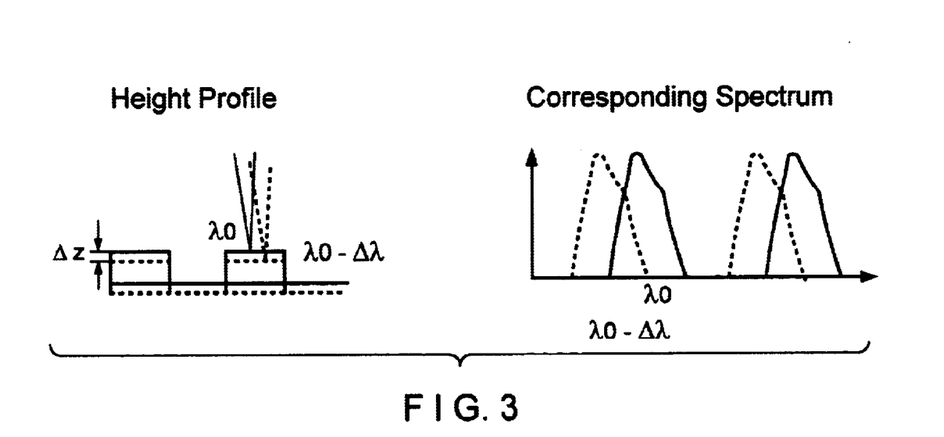
FIG. 3 shows the displacement of a spectral line through height differences on the surface of a conductor path.

The spectral deviation $\Delta \lambda$ from a wavelength $\lambda o$ corresponding to a height deviation $\Delta z$ is shown schematically in FIG. 3.

The vertical position of the object being examined relative to the imaging optics is selected by a suitable Z adjustment, e.g., of a Z stage, in such a way that a determined spectral line corresponds to a determined height level of the object, Ideally, this line $\lambda_0$ (reference maximum) characterizes a marked level, e.g., the conductor path surfaces of a wafer. Depending on the adjusted color spread and the utilized chromates 6 (see, e.g., Table 1), variations in height (Z direction) by an amount $\Delta z$ correspond to a displacement of this main line by a corresponding $\Delta \lambda$. In any recorded spectrum, the exact position of the maximum will be determined in the range of $\lambda_0$. If the maximum deviates by a previously established value of $\lambda_0$, a readjustment of the Z stage position is carried out by an adjusting element, preferably a piezo-adjustment element. If the deviation is less than this previously established value, the complete spectrum is shifted accordingly by electronic means and one of the above-described defect detection algorithms is then carried out.

Further, the above-mentioned process for height monitoring is advantageously suitable as an autofocus process for a confocal microscope. As is well known, the advantages of confocal microscopy consist in that a defined object plane, the focal plane, is isolated in the image. The optical imaging of other planes is suppressed by the confocal principle. Therefore, only the focal plane is visible in the image. In the case of wafer inspection, a determined wafer plane can be focused with the confocal principle. All other planes appear dark in this image. Accordingly, the confocal method is advantageous in applications in which only one determined plane is to be examined. This simplifies digital image processing for detection of defects.

However, the application of confocal microscopy for analysis of specific planes, for example, of a wafer, requires a highly precise autofocusing system which focuses exactly on the relevant plane. Conventional autofocus processes (e.g., the triangulation process) measure only the height position of a determined object point. Therefore, depending on the existing structure, the relevant plane is not necessarily focused. Averaging processes over a plurality of object points also focus only on any plane.

However, the present invention enables the recording of a height histogram, i.e., the height distribution along a determined object area, through spectral analysis. An evaluation of this distribution according to the height monitoring algorithm mentioned above makes it possible to focus on a determined plane to which, for example, wavelength $\lambda_0$ in FIG. 3 corresponds.

Figure 4:
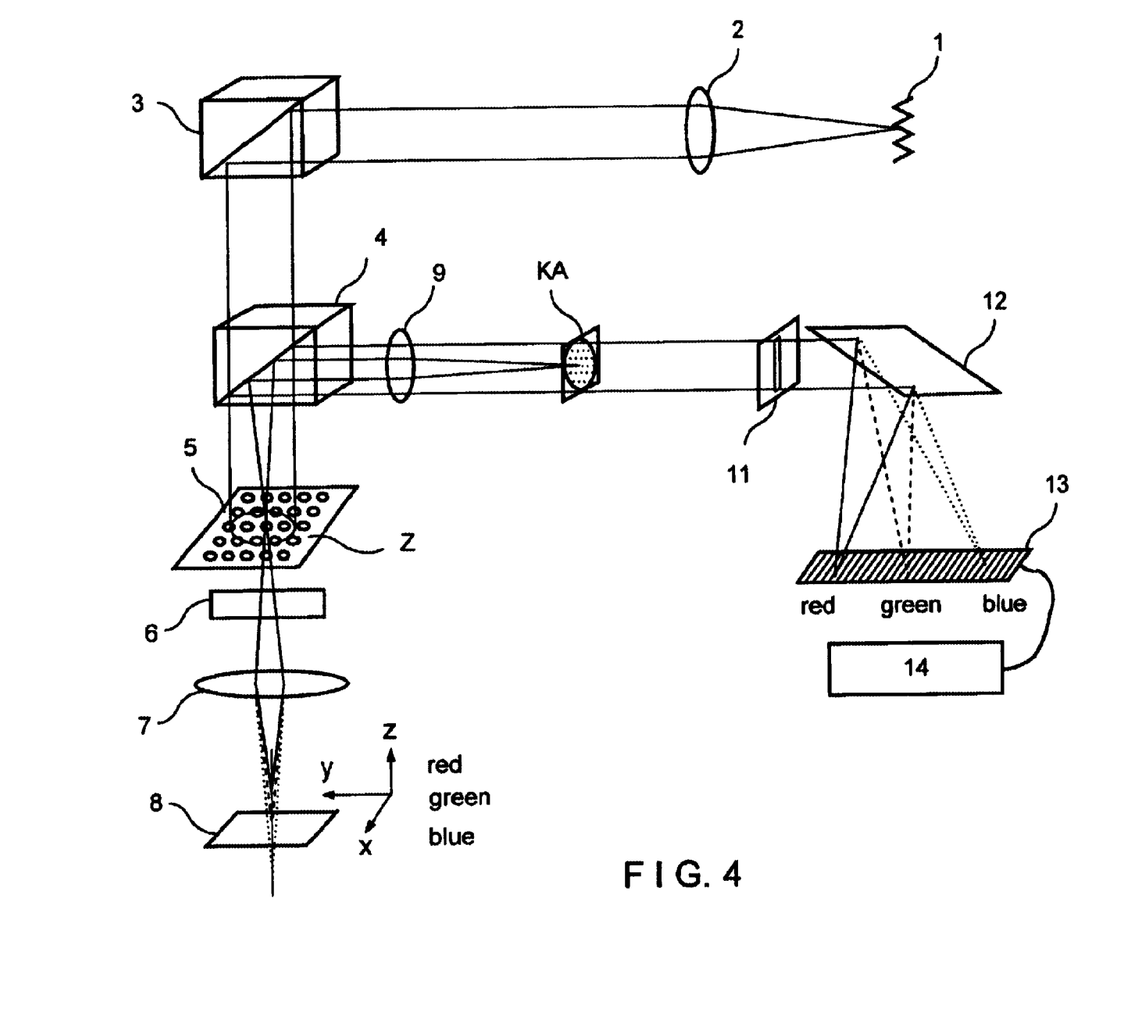
FIG. 4 shows the imaging of the generated intermediate image on a spectrometer entrance slit.

In FIG. 4, a microscope objective 7 with a tube lens (not shown) generates an intermediate image Z which lies in the plane of the pinhole arrangement 5. This intermediate image is imaged, for example, on the camera output KA of the microscope, by means of imaging optics 9. A portion of the field of this camera output KA is imaged in a diode array spectrometer through a slit 11 which is preferably located in the image plane of the camera output or in a plane which is optically conjugated with the latter, wherein the diode array spectrometer is composed of a grating 12, in this case a holographic grating, a diode line 13, and an evaluating unit 14 which in this case comprises a storage, display unit and comparator.

The object is scanned by a step-and-go mode with an XY stage, not shown. Known interferometric path measurement systems, for example, are provided for detecting the stage position, wherein the driving and sensing of the stage position in the X, Y and Z directions is coupled with the spectral evaluation by a connection with the evaluating unit 14.

Therefore, in this construction only a part of the intermediate image field is transmitted into the spectrometer. The evaluation and defect detection are carried out in the evaluating unit by a comparison with a stored ideal height profile (die-to-database comparison) or with one or more previous height profiles (die-to-die comparison) corresponding to the defect detection algorithm, shown above, with the height monitoring algorithm indicated above.

Figure 5:
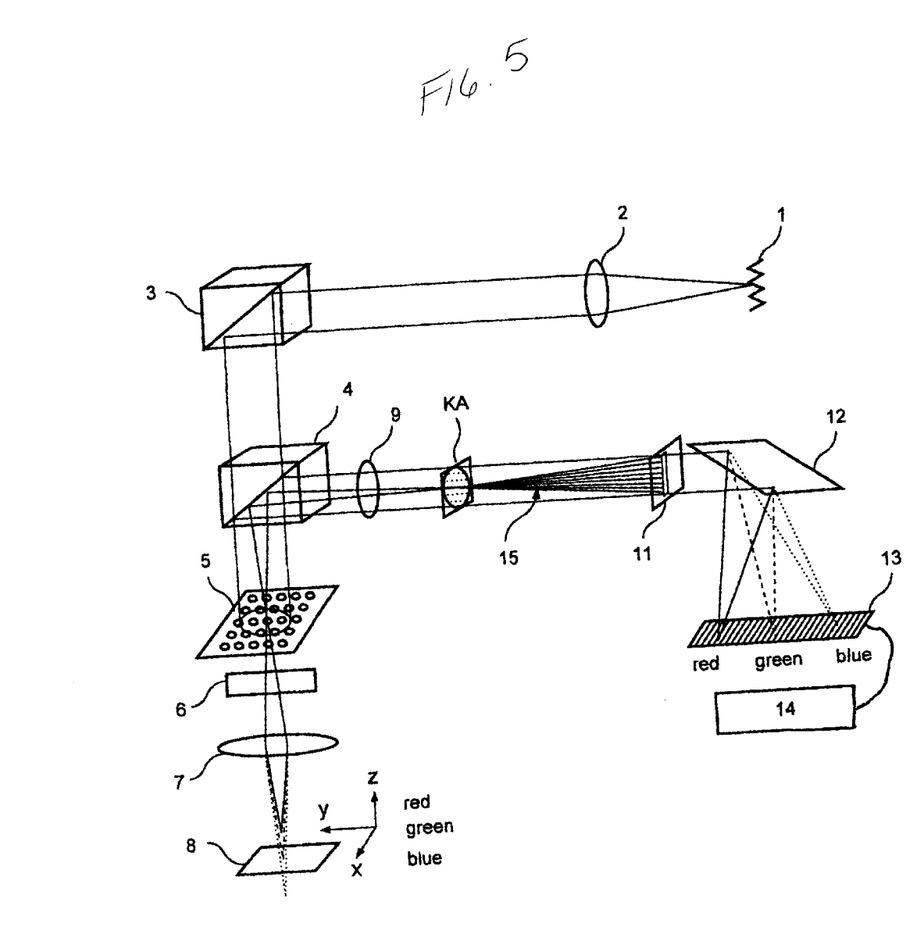
FIG. 5 shows a first construction with a cross section converter.

In another advantageous embodiment form according to FIG. 5, a portion of the intermediate image field imaged on camera output KA is imaged with an incoherent glass fiber bundle 15 serving as a cross section converter in a diode array spectrometer comprising a grating 12, a diode line 13 and an evaluating unit 14 in that the fibers are arranged in the intermediate image plane as a light entrance bundle and in front of the entrance slit 11. Accordingly, a larger surface of the intermediate image field can be spectrally analyzed simultaneously.

The evaluation and defect detection of defects as well as the scanning movement and Z monitoring are carried out in the manner described above.

Figure 6:
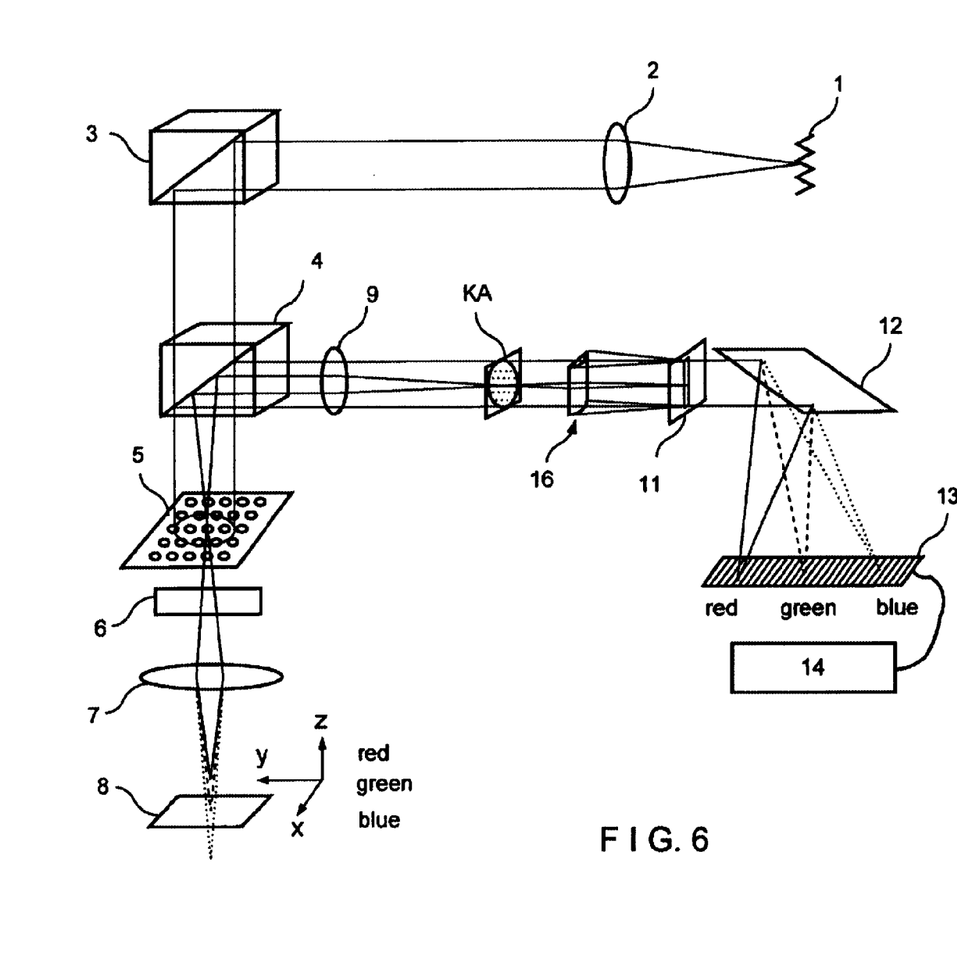
FIG. 6 shows a second construction with cross section converter.

In another advantageous embodiment form according to FIG. 6, for integral spectral analysis of the entire intermediate image field, an anamorphotic (cylinder-optics) cross section converter 16 is used for imaging the intermediate image in the spectrometer slit 11, i.e., the imaging measurement scales in the slit direction and vertical to the slit direction are different. This embodiment form has the advantage that the entire intermediate image field or the greater portion thereof can be analyzed spectrally. The evaluation, defect detection, scanning movement and Z monitoring are carried out in the manner described above.

Figure 7:
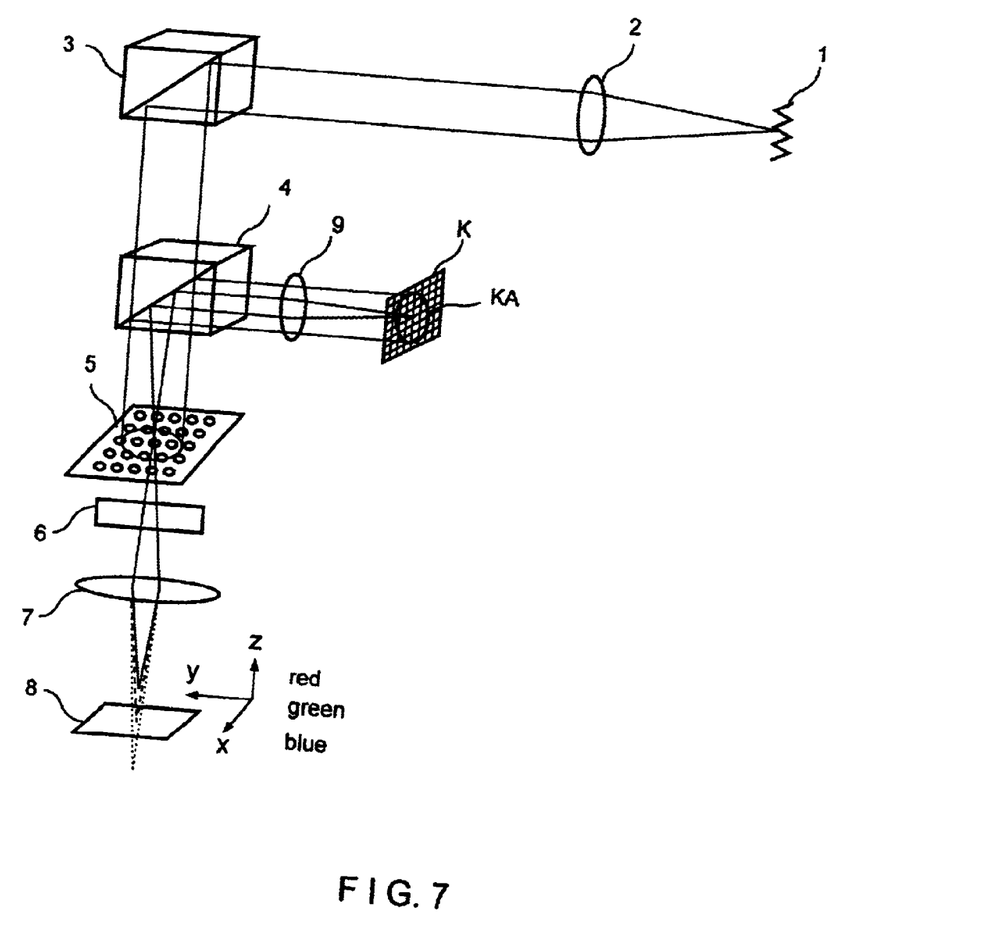
FIG. 7 shows a construction with a color camera for image evaluation.

In another embodiment form according to FIG. 7, a camera K which is mounted at the camera output KA of the microscope is used for spectral analysis of the entire intermediate image.

When a black-and-white camera is used, the analysis is carried out by pixel through comparison of the grayscale values. When a color camera is used, the analysis is carried out by pixels through a color comparison. The grayscale values or colors are counted by pixels and displayed spectrally according to color or grayscale value in a histogram. Alternatively, the spectral color information can also be obtained by using two black-and-white cameras in combination with different filters as is described in WO 95/00871 and SCANNING, Vol. 14, 1992, pages 145–153. The height monitoring is carried out by means of an autofocus system, preferably by means of the autofocus process shown above, and the defect detection is carried out by means of the defect detection algorithm.

Figure 8:
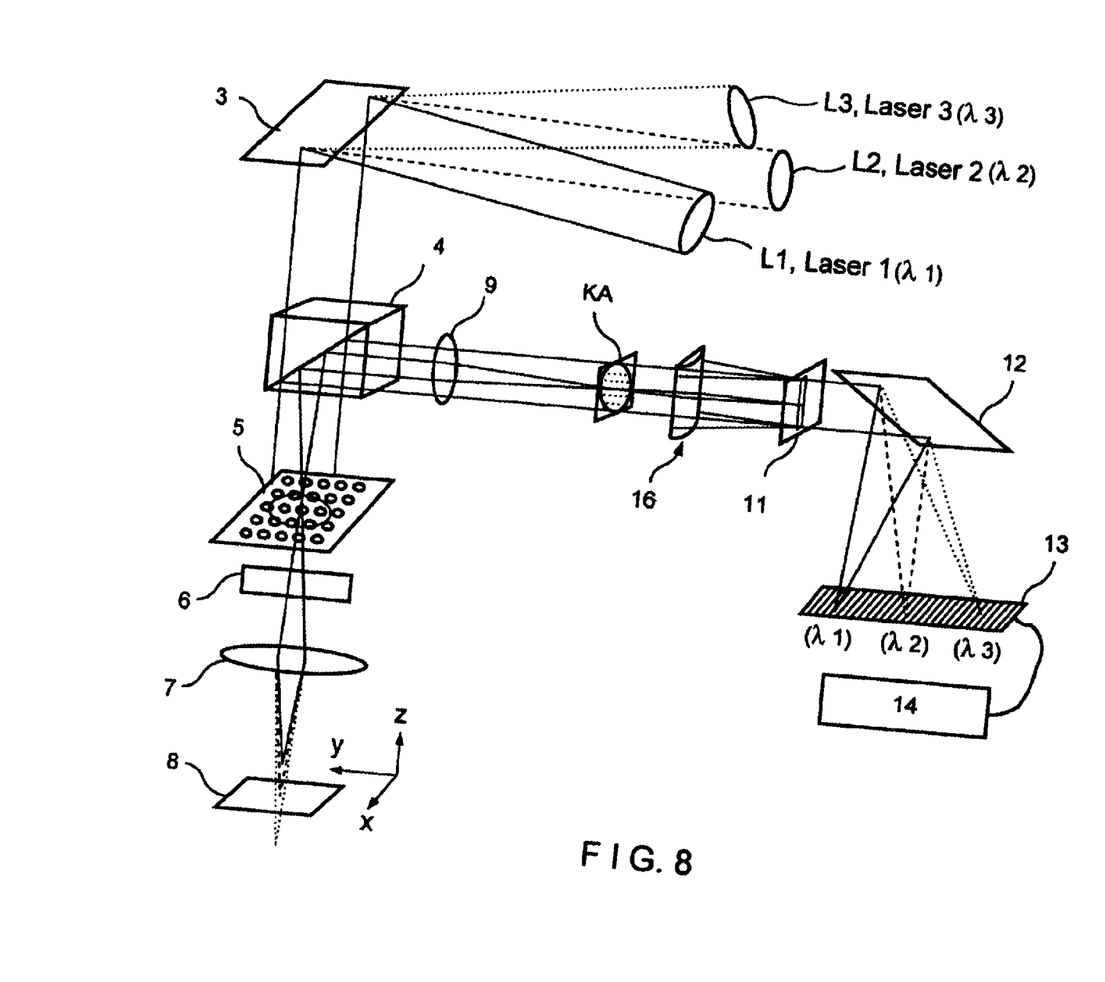
FIG. 8 shows a construction with a plurality of lasers of different wavelength.
Figure 9:
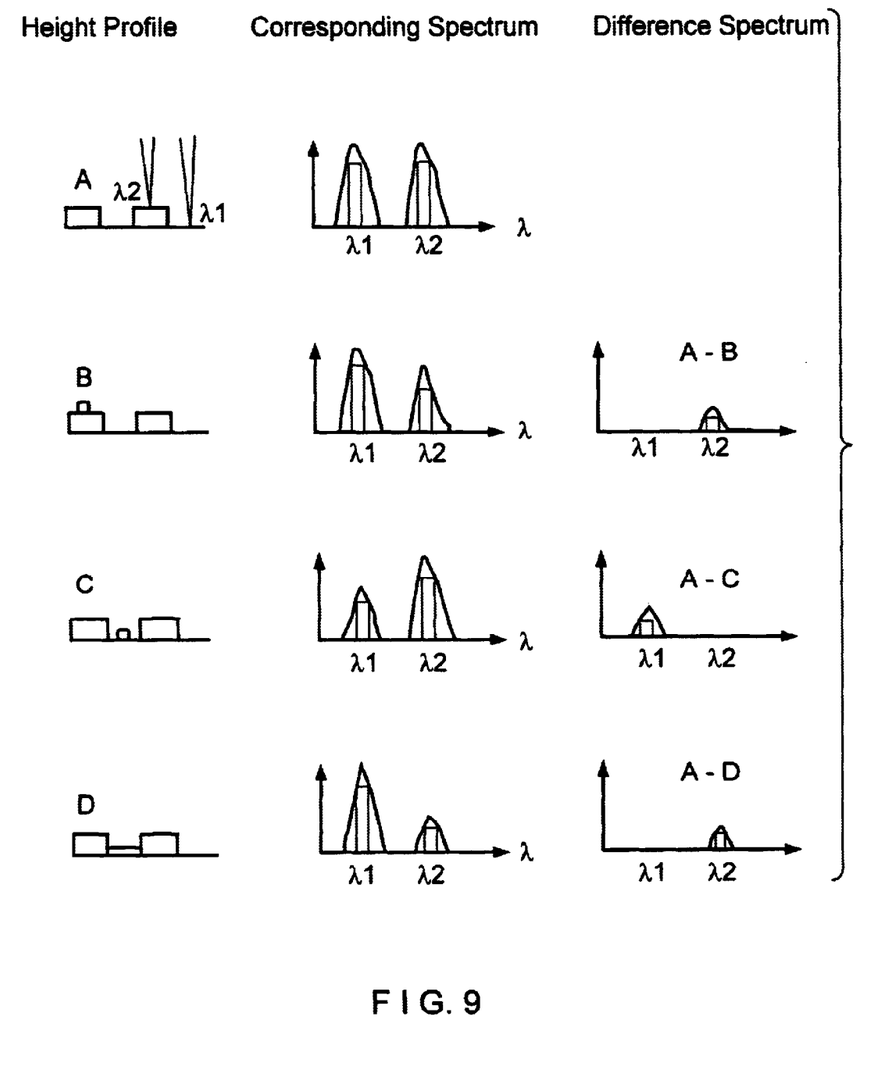
FIG. 9 shows spectra for different height profiles when focusing on two planes with laser wavelengths l1 and l2.

FIG. 8 shows another embodiment form, wherein the white light source is replaced by an illumination with 3 lasers L1–L3 of different colors. Through the use of lasers, different image planes can be emphasized in a deliberate manner. The occurring spectrum comprises only the lines of the utilized laser wavelengths $\lambda_1$, $\lambda_2$ and $\lambda_3$. The integral number of events of the respective lines is proportional to the surface component of the corresponding focal plane. When defects are present in this plane, the number of detected photons decreases correspondingly as is shown schematically for two wavelengths in FIG. 9.

Thus, defects express themselves only in the integral number of detected events, but not, as in the embodiment forms with a white light source, also in different wavelengths. In this embodiment form, the cross section converter shown in the embodiment forms described above is used as cross section converter 16. The anamorphotic imaging 16 is shown.

During detection of defects, the above-mentioned defect detection algorithm is simplified. After subtracting the spectra, it is only necessary to count events above a noise threshold in the area of the utilized laser wavelengths. The number of these events is then proportional to the surface component of the defect on the corresponding height line.

Typical color spreads for different-objectives are indicated in Table 1.

TABLE 1

| Color Spread | |
|---|---|
| Magnification | Color spread in Z direction |
| 10× | 100 µm |
| 20× | 25 µm |
| 50× | 4 µm |
| 100× | 1 µm |
| 150× | 0.45 µm |

While the foregoing description and drawings represent the present invention, it will be obvious to those skilled in the art that various changes may be made therein without departing from the true spirit and scope of the present invention.

What is claimed is:

1. An automatic inspection process for determining deviations of at least a first height profile from at least one simultaneously or previously detected second height profile, for detecting and/or monitoring defects in semiconductor wafers utilizing a confocal microscope comprising:

an illumination arrangement for illuminating an object in a confocal raster pattern;

first means for generating a first wavelength-selective splitting of the illumination light;

second means for generating a second wavelength-selective splitting of the light coming from the object in a simultaneous manner for a plurality of points at varying heights of the object, the light coming from the object containing spectrally coded height information for the plurality of points of the object; and detection means for detecting the light distribution generated by the second means, said process including the steps of:

illuminating a first object in a wavelength-selective manner by the illumination arrangement; and detecting the light originating from the first object with an array of detectors and comparing detected light electronically with a previously or simultaneously detected second object.

2. The process according to claim 1, wherein the step of comparing includes comparing adjacent areas of one and the same object.

3. The process according to claim 1, wherein the step of comparing includes comparing the detected light with a stored object.

4. The process according to claim 1, wherein the step of comparing includes averaging the detection of a plurality of object areas or objects and formation of a reference value.

5. The process according to at claim 1, wherein the step of comparing includes subtracting a detected image of the object from the image of the second object, or vice versa.

6. A method of determining a height deviation of a first semiconductor object in a wafer from a reference semiconductor object in a wafer utilizing a confocal microscope, the method comprising:

simultaneously illuminating with light from a light source a plurality of points at varying heights of a first semiconductor object in a wavelength selective manner using a confocal microscope;

simultaneously receiving the light coming from the plurality of points of the first object, the received light containing spectrally coded height information for the plurality of points of the first object; and comparing the light distribution from the received light with the light distribution of a reference semiconductor object to determine a height deviation of the first object from the reference object.

7. The method according to claim 6, wherein the step of comparing includes detecting the light distribution using CCD lines or diode lines.

8. The method according to claim 6, prior to the step of comparing, further comprising dispersing the received light into a spectrum of wavelengths through a dispersive element.

9. The method according to claim 6, further comprising determining the difference between the light distribution from the received light and the light distribution of the reference object to obtain a height deviation of the first object from the reference object.

10. The method according to claim 9, further comprising determining the light distribution of the reference object by averaging a plurality of light distributions.

11. The method according to claim 6, wherein the step of simultaneously illuminating a plurality of points of a first object in a wavelength selective manner includes generating a longitudinal chromatic aberration in the light.

12. The method according to claim 11 wherein the step of simultaneously illuminating a plurality of points of a first object includes passing the light source through a Nipkow disk.

* * * * *